(12) United States Patent
Lu et al.

(10) Patent No.: US 10,712,262 B1
(45) Date of Patent: Jul. 14, 2020

(54) RARE EARTH SOLUTION IMAGE CAPTURE DEVICE AND METHOD

(71) Applicant: EAST CHINA JIAOTONG UNIVERSITY, Nanchang, Jiangxi (CN)

(72) Inventors: Rongxiu Lu, Nanchang (CN); Yunchun Rao, Nanchang (CN); Hui Yang, Nanchang (CN); Jianyong Zhu, Nanchang (CN); Gang Yang, Nanchang (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 0 days.

(21) Appl. No.: 16/431,919

(22) Filed: Jun. 5, 2019

(30) Foreign Application Priority Data

Feb. 21, 2019 (CN) .......................... 2019 1 0128128

(51) Int. Cl.
*G01J 3/42* (2006.01)
*G01N 21/27* (2006.01)
*G01N 21/84* (2006.01)
*C22B 59/00* (2006.01)
*G06T 7/194* (2017.01)
*G06T 7/90* (2017.01)

(52) U.S. Cl.
CPC ............. *G01N 21/27* (2013.01); *C22B 59/00* (2013.01); *G01N 21/84* (2013.01); *G06T 7/194* (2017.01); *G06T 7/90* (2017.01)

(58) Field of Classification Search
CPC ........ G01N 21/27; G01N 21/84; C22B 59/00; G06T 7/194; G06T 7/90
See application file for complete search history.

(56) References Cited

U.S. PATENT DOCUMENTS

2015/0158736 A1\* 6/2015 Kronholm ............ B01D 15/362
423/21.5

\* cited by examiner

*Primary Examiner* — Abdullahi Nur
(74) *Attorney, Agent, or Firm* — Avant Law Group, LLC

(57) ABSTRACT

A method and device relate to rare earth solution image capturing, and further relate to the field of rare earth hydrometallurgical process detection technologies. According to an embodiment, a rare earth solution image capture device includes a mixer-settler, a support platform, a camera obscura, a solution collection vessel, a color camera, a light source, a computer, a programmable logic controller, a motor driver, a peristaltic pump, and a conduit pipe. According to another embodiment, the rare earth solution image capture device performs automatic sampling by using the programmable logic controller and may perform detection at any time. An image captured by the color camera may be transmitted to the computer in real time without manual intervention.

10 Claims, 3 Drawing Sheets

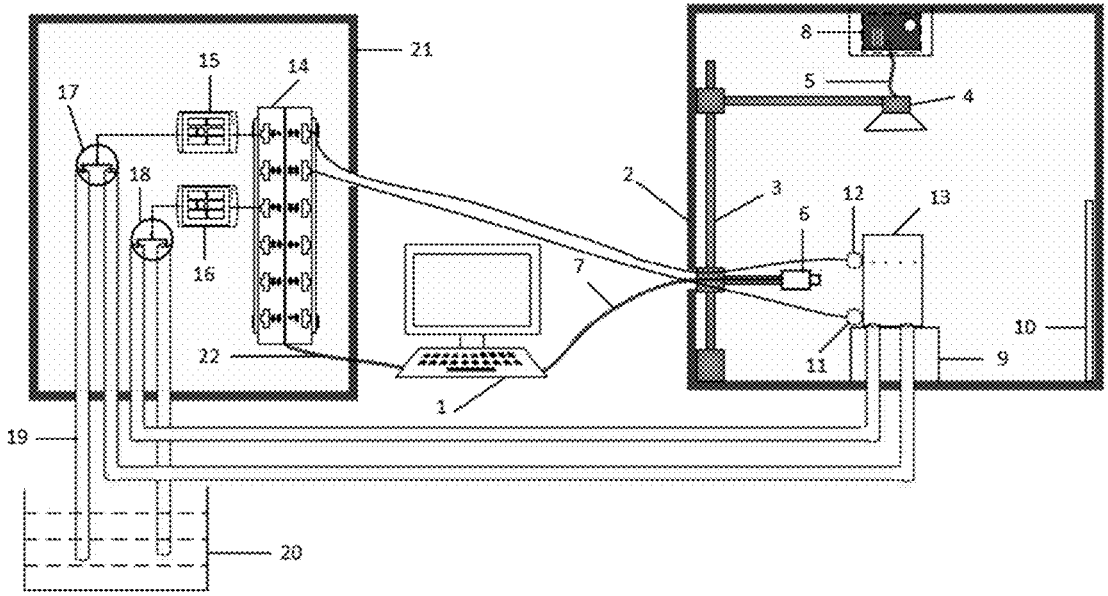

FIG. 1

201 Obtain a starting signal, and control, by using a programmable logic controller, a first motor driver to drive a first peristaltic pump, and transfer, by the first peristaltic pump, rare earth solution in a mixer -settler to a solution collection vessel 202 After transferring of the rare earth solution is performed for a first specified time period, control, by using the programmable logic controller, the first motor driver to stop driving the first peristaltic pump 203 Obtain an image of the rare earth solution in the solution collection vessel captured by the color camera, process the captured image, store a processing result, and perform digital conversion on the obtained image of the solution collection vessel captured by the color camera 204 Determine a remaining service life prediction model according to the coefficients, and predict remaining service life of the product 205 Control, by using the programmable logic controller, a second motor driver to drive a second peristaltic pump, and transfer, by the second peristaltic pump, rare earth solution in the solution collection vessel to the mixer -settler 206 After transferring of the rare earth solution is performed for a third specified time period, control, by using the programmable logic controller, the second motor driver to stop driving the second peristaltic pump

FIG. 2

RARE EARTH SOLUTION IMAGE CAPTURE DEVICE AND METHOD

CROSS REFERENCE TO RELATED APPLICATIONS

This application claims priority to Chinese application number 20191012812-8.9 filed on Feb. 21, 2019, the disclosure of which is incorporated by reference herein in its entirety.

FIELD OF THE DISCLOSURE

The disclosure relates generally to the field of rare earth hydrometallurgical process detection technologies. More specifically, the disclosure relates to the field of a rare earth solution image capture device and method.

BACKGROUND

Rare earth elements, known as the "vitamin" of industry, are key materials used in many electronic products and weapon systems. Because of numerous components of a rare earth material and very similar properties of rare earth elements, cascade extraction is usually used in the industrial production of rare earth to complete separation of elements in the rare earth material. In order to obtain single high-purity rare earth elements, a mixer-settler used in rare earth extraction and separation sometimes is provided with hundreds of stages, and element components between adjacent stages change little in content and easily generate strong coupling. As a result, there is obvious hysteresis of control strategy adjustment and it is difficult to perform control in real time. If component content of elements of an export product is not within a production requirement, the elements of the export product need to be extracted again, leading to a great waste of manpower, material resources, and time.

In current practice, in-situ sampling and off-line detection in a laboratory are mainly used to obtain information about component content of rare earth elements. However, a rare earth solvent extraction is a continuous process, and consequently the off-line detection method cannot accurately reflect a real situation in real time. Many enterprises use online detection methods, such as a spectrophotometric method and a ray analysis method. A spectrophotometer and an optical fiber reflection probe are combined in detection based on the spectrophotometric method, and during the detection, the probe is inserted into a mixer-settler, and the spectrophotometer scans the probe and reflects light to implement the detection of component content of elements in rare earth mixed liquid. This method requires an operator to perform an actual operation at an extraction site, and therefore there is a specific delay. As a result, there is a problem of a detection delay in the spectrophotometric method. In the ray analysis method, a Compton scattering principle is mainly used, and a detection instrument performs online detection of component content of rare earth elements in an extraction process. This ray analysis method can only be used for single detection, and therefore cannot perform continuous detection. Thus, the existing detection methods have a problem of not being able to perform continuous detection in real time.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, an objective of the disclosure is to provide a rare earth solution image capture device and method, which may resolve a problem that detection cannot be performed continuously in real time.

According to an embodiment, a rare earth solution image capture device includes a mixer-settler, a support platform, a camera obscura, a solution collection vessel, a color camera, a light source, a computer, a programmable logic controller, a motor driver, a peristaltic pump, and a conduit pipe, wherein the mixer-settler and the solution collection vessel are used to accommodate rare earth solution. The support platform, the solution collection vessel, the color camera, and the light source are all disposed in the camera obscura. The solution collection vessel is disposed on the support platform. The color camera directly faces the solution collection vessel. The light source is disposed right above the solution collection vessel. An output end of the color camera is electrically connected to the computer. The computer is electrically connected to the programmable logic controller. The programmable logic controller is electrically connected to the motor driver. The motor driver is electrically connected to the peristaltic pump. One end of the conduit pipe is communicated with the solution collection vessel. The other end of the conduit pipe is communicated with the rare earth solution. The peristaltic pump is stuck on the conduit pipe; the camera obscura is used to isolate an external light source. The color camera is used to capture a real-time image of the rare earth solution in the solution collection vessel. The computer is used to perform processing on the real-time image captured by the color camera. The programmable logic controller is used to control the motor driver. The motor driver is used to drive the peristaltic pump. The peristaltic pump is used to transfer the rare earth solution in the mixer-settler to the solution collection vessel, or transfer the rare earth solution in the solution collection vessel to the mixer-settler.

According to another embodiment, the rare earth solution image capture device further includes a programmable logic controller rack, and the programmable logic controller, the motor driver, and the peristaltic pump are disposed on the programmable logic controller rack.

According to a further embodiment, the rare earth solution image capture device further includes a movable rail bracket. The movable rail bracket is disposed in the camera obscura, and the color camera and the light source are disposed on the movable rail bracket.

According to one embodiment, the rare earth solution image capture device further includes a light source regulator. The light source regulator is disposed in the camera obscura, and the light source regulator is electrically connected to the light source. The light source regulator is used to regulate luminance of the light source.

In some embodiments, the rare earth solution image capture device further includes a white balance grey chip. The white balance grey chip is disposed in the camera obscura. The white balance grey chip directly faces the solution collection vessel, and is disposed in a direction different from a placement direction of the color camera. The white balance grey chip is used to increase a contrast ratio of the rare earth solution and restore a color of the rare earth solution.

In other embodiments, the rare earth solution image capture device further includes a first liquid level sensor and a second liquid level sensor. The first liquid level sensor is installed on the upper half part of the solution collection vessel. The second liquid level sensor is installed on the lower half part of the solution collection vessel. The first liquid level sensor and the second liquid level sensor are used to detect a liquid level of the rare earth solution in the solution collection vessel.

In further embodiments, the motor driver includes a first motor driver and a second motor driver. The peristaltic pump includes a first peristaltic pump and a second peristaltic pump. The first motor driver is electrically connected to the first peristaltic pump, and the second motor driver is electrically connected to the second peristaltic pump. The first peristaltic pump is used to transfer the rare earth solution in the mixer-settler to the solution collection vessel, and the second peristaltic pump is used to transfer the rare earth solution in the solution collection vessel to the mixer-settler.

According to an embodiment, a rare earth solution image capture method is implemented by using the disclosed rare earth solution image capture devices. The rare earth solution image capture method includes: obtaining a starting signal, and controlling, by using a programmable logic controller, a first motor driver to drive a first peristaltic pump, and transferring, by the first peristaltic pump, rare earth solution in a mixer-settler to a solution collection vessel; after transferring of the rare earth solution is performed for a first specified time period, controlling, by using the programmable logic controller, the first motor driver to stop driving the first peristaltic pump; after standing is performed for a second specified time period, regulating a position and luminance of a light source, and adjusting a position and a shooting angle of a color camera; obtaining an image of the rare earth solution in the solution collection vessel captured by the color camera, processing the captured image, and storing a processing result; controlling, by using the programmable logic controller, a second motor driver to drive a second peristaltic pump, and transferring, by the second peristaltic pump, the rare earth solution in the solution collection vessel to the mixer-settler; and after transferring of the rare earth solution is performed for a third specified time period, controlling, by using the programmable logic controller, the second motor driver to stop driving the second peristaltic pump.

According to another embodiment, before the processing of the captured image, the method further includes performing digital conversion on the obtained image of the rare earth solution in the solution collection vessel captured by the color camera.

According to a further embodiment, the processing of the captured image includes converting the converted image from RGB space to HSI space, and performing median filtering on the converted image; performing background segmentation on the median-filtered image, and separating a solution part of the median-filtered image, to obtain pixel center coordinates of the target solution part; and cropping the image by using the pixel center coordinates as a center to obtain a square image, and extracting a color feature component from the square image.

Some embodiments of the present invention may have one or more of the following effects: the invention may provide a rare earth solution image capture device and method. The rare earth solution image capture device includes a mixer-settler, a support platform, a camera obscura, a solution collection vessel, a color camera, a light source, a computer, a programmable logic controller, a motor driver, a peristaltic pump, and a conduit pipe. The rare earth solution image capture device may perform automatic sampling by using the programmable logic controller and may perform detection at any time. An image captured by the color camera may be transmitted to the computer in real time without manual intervention, which may resolve the existing problem that detection cannot be performed continuously in real time. In the rare earth solution image capture method, the computer may be used to process an image, which may reduce labor intensity and improve efficiency. In addition, the rare earth solution image capture device may also extract color feature information of rare earth solution, which may provide a large amount of real and effective data for establishment of a component content soft-sensing prediction model

BRIEF DESCRIPTION OF THE DRAWINGS

FIG. 1 is a structural diagram of a rare earth solution image capture device according to Embodiment 1 of the disclosure.

FIG. 2 is a flowchart of a rare earth solution image capture method according to Embodiment 2 of the disclosure.

DETAILED DESCRIPTION

Figure 3:
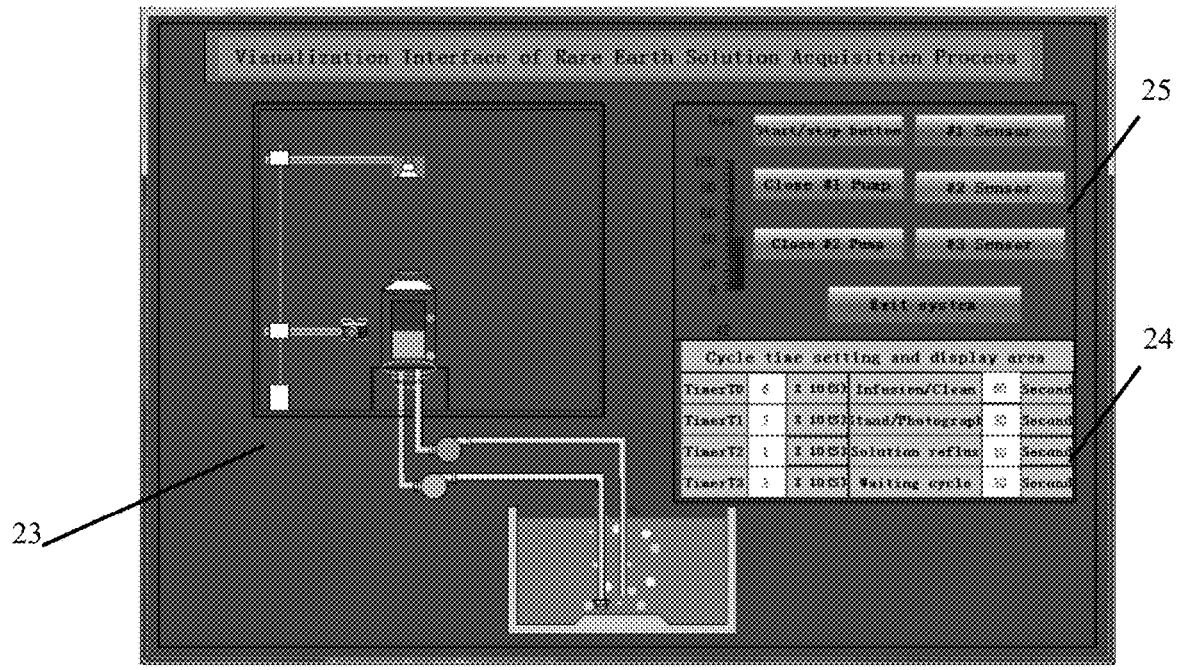
FIG. 3 is a diagram of a WINCC solution collection control interface according to Embodiment 3 of the disclosure.

The following describes multiple exemplary embodiments of the disclosure with reference to the accompanying drawings in the embodiments. In FIGS. 1-4, 1 represents computer; 2 represents camera obscura; 3 represents movable rail bracket; 4 represents LED ring light source; 5 represents USB data cable; 6 represents CCD color camera; 7 represents 1394 data cable; 8 represents light source regulator; 9 represents support platform; 10 represents white balance grey chip; 11 represents first liquid level sensor; 12 represents second liquid level sensor; 13 represents solution collection vessel; 14 represents programmable logic controller; 15 represents first motor driver; 16 represents second motor driver; 17 represents first peristaltic pump; 18 represents second peristaltic pump; 19 represents conduit pipe; 20 represents mixer-settler; 21 represents programmable logic controller rack; 22 represents network cable; 23 represents visual area; 24 represents cycle time setting and display area; 25 represents key control area; 26 represents image display area; 27 represents key control area; 28 represents image analysis area; 29 represents result display and storage area.

The described embodiments are merely a part rather than all of the embodiments of the disclosure. All other embodiments obtained by a person of ordinary skill in the art based on the embodiments of the present invention without creative efforts shall fall within the protection scope of the present invention.

Embodiment 1

This embodiment provides a rare earth solution image capture device. FIG. 1 is a structural diagram of the rare earth solution image capture device according to Embodiment 1 of the disclosure. Referring to FIG. 1, the rare earth solution image capture device includes a mixer-settler 20, a support platform 9, a camera obscura 2, a solution collection vessel 13, a color camera 6, a light source, a computer 1, a programmable logic controller 14, a motor driver, a peristaltic pump, and a conduit pipe 19.

The mixer-settler 20 and the solution collection vessel 13 may be used to accommodate rare earth solution. The support platform 9, the solution collection vessel 13, the color camera 6, and the light source are all disposed in the camera obscura 2. The camera obscura 2 may be used to isolate an external light source. The solution collection vessel 13 is disposed on the support platform 9. The color camera 6 directly faces the solution collection vessel 13. The color camera 6 may be used to capture a real-time image of rare earth solution in the solution collection vessel 13. The color camera 6 is a CCD (Charge Coupled Device, Charge Coupled Device) camera. The light source is disposed right above the solution collection vessel 13, and the light source is an LED ring light source 4. The LED ring light source 4 is disposed right above the solution collection vessel, and may provide stable and uniform illumination for the rare earth solution in the solution collection vessel 13.

An output end of the color camera 6 is electrically connected to the computer 1, and the color camera is connected to an image capture card through a 1394 data cable 7, where the image capture card is installed in a PCI card slot of the computer 1. The computer 1 is electrically connected to the programmable logic controller 14 through a network cable 22. The computer 1 may be used to perform processing on the real-time image captured by the color camera 6.

The programmable logic controller 14 is electrically connected to the motor driver. The programmable logic controller 14 may be used to control the motor driver, and the programmable logic controller 14 is a Siemens PLC (programmable logic controller). The PLC includes an Ethernet module, and is connected to the computer 1 through an RJ45 network interface of the Ethernet module. The motor driver is electrically connected to the peristaltic pump. The motor driver may be used to drive the peristaltic pump. One end of the conduit pipe 19 is communicated with the solution collection vessel 13, and the other end of the conduit pipe 19 is communicated with the rare earth solution in the mixer-settler 20. The peristaltic pump is stuck on the conduit pipe 19. The peristaltic pump may be used to transfer the rare earth solution in the mixer-settler 20 to the solution collection vessel 13, or transfer the rare earth solution in the solution collection vessel 13 to the mixer-settler 20. The rare earth solution image capture device further includes a programmable logic controller rack 21. The programmable logic controller 14, the motor driver, and the peristaltic pump are all disposed on the programmable logic controller rack 21. The programmable logic controller rack 21 may be fastened to a top part of the camera obscura 2.

The rare earth solution image capture device further includes a movable rail bracket 3; the movable rail bracket 3 is disposed in the camera obscura 2; and the color camera 6 and the light source are disposed on the movable rail bracket 3. The movable rail bracket 3 includes a horizontal moving arm and a vertical moving arm, and the horizontal moving arm is flexibly connected to the vertical moving arm. The light source is disposed on the horizontal moving arm, and the color camera 6 is disposed on the vertical moving arm.

The rare earth solution image capture device further includes a light source regulator 8, and the light source regulator 8 is disposed in the camera obscura 2. The light source regulator 8 is electrically connected to the light source, and the LED ring light source 4 is connected to the light source regulator 8 through a USB data cable 5. The light source regulator 8 may be used to regulate luminance of the light source, and the light source regulator 8 may regulate intensity of the LED ring light source 4. This facilitates search of an optimum light source.

The rare earth solution image capture device further includes a white balance grey chip 10; the white balance grey chip 10 is disposed in the camera obscura 2. The white balance grey chip 10 directly faces the solution collection vessel 13, and is disposed in a direction different from a placement direction of the color camera 6. The white balance grey chip 10 may be used to increase a contrast ratio of the rare earth solution in the solution collection vessel 13 and restore a color of the rare earth solution, and the white balance grey chip 10 is disposed behind the solution collection vessel 13 as a shooting background, and this may increase a contrast ratio and restore the rare earth solution to an optimum color.

The rare earth solution image capture device further includes a first liquid level sensor 11 and a second liquid level sensor 12. The first liquid level sensor 11 is installed on the upper half part of the solution collection vessel 13, and the second liquid level sensor 12 is installed on the lower half part of the solution collection vessel 13. The first liquid level sensor 11 and the second liquid level sensor 12 may be used to detect a liquid level of the rare earth solution in the solution collection vessel 13, and the first liquid level sensor 11 and the second liquid level sensor 12 both are connected to a digital input end of a Siemens PLC.

The motor driver includes a first motor driver 15 and a second motor driver 16, and the peristaltic pump includes a first peristaltic pump 17 and a second peristaltic pump 18. The first motor driver 15 is electrically connected to the first peristaltic pump 17, and the second motor driver 16 is electrically connected to the second peristaltic pump 18. The first peristaltic pump 17 may be used to transfer the rare earth solution in the mixer-settler 20 to the solution collection vessel 13. The second peristaltic pump 18 may be used to transfer the rare earth solution in the solution collection vessel 13 to the mixer-settler 20.

Embodiment 2

This embodiment provides a rare earth solution image capture method, implemented by the rare earth solution image capture device in Embodiment 1.

FIG. 2 is a flowchart of a rare earth solution image capture method according to Embodiment 2 of the present invention. Referring to FIG. 2, the rare earth solution image capture method includes the following steps:

Step 201. Obtain a starting signal, and control, by using a programmable logic controller, a first motor driver to drive a first peristaltic pump, and transfer, by the first peristaltic pump, rare earth solution in a mixer-settler to a solution collection vessel.

Step 202. After transferring of the rare earth solution is performed for a first specified time period, control, by using the programmable logic controller, the first motor driver to stop driving the first peristaltic pump.

Step 203. After standing is performed for a second specified time period, regulate a position and luminance of a light source, and adjust a position and a shooting angle of a color camera.

Step 204. Obtain an image of the rare earth solution in the solution collection vessel captured by the color camera, process the captured image, store a processing result, and perform digital conversion on the obtained image captured by the color camera. The image captured by the color camera is an image of rare earth solution in the solution collection vessel. The processing of the captured image includes: converting the converted image from RGB space to HSI space, and performing median filtering on the converted image; performing background segmentation on the median-filtered image, and separating a solution part of the median-filtered image, to obtain pixel center coordinates of the target solution part; and cropping the image by using the pixel center coordinates as a center to obtain a square image, and extracting a color feature component from the square image.

Step 205. Control, by using the programmable logic controller, a second motor driver to drive a second peristaltic pump, and transfer, by the second peristaltic pump, rare earth solution in the solution collection vessel to the mixer-settler.

Step 206. After transferring of the rare earth solution is performed for a third specified time period, control, by using the programmable logic controller, the second motor driver to stop driving the second peristaltic pump.

Embodiment 3

This embodiment provides a rare earth solution image capture device. The rare earth solution image capture device includes a rare earth extraction solution collection and image acquisition hardware platform and upper computer control software.

The rare earth extraction solution collection and image acquisition hardware platform includes a computer, a camera obscura, a movable rail bracket, a light source, a USB data cable, a color camera, a 1394 data cable, a light source regulator, a support platform, a white balance grey chip, a liquid level sensor, a solution collection vessel, a programmable logic controller (Programmable Logic Controller, PLC), a motor driver, a peristaltic pump, and a conduit pipe, a network cable, and several wires.

The mixer-settler and the solution collection vessel may be used to accommodate rare earth solution.

The support platform, the solution collection vessel, the color camera, and the light source are all disposed in the camera obscura. The camera obscura may be used to isolate an external light source.

The solution collection vessel is disposed on the support platform.

The color camera directly faces the solution collection vessel. The color camera may be used to capture a real-time image of rare earth solution in the solution collection vessel. The color camera is a CCD (Charge Coupled Device, Charge Coupled Device) camera. The color camera is a Flea2 FL2G-13S2C color camera produced by Point Grey in Canada. Main parameters of the camera are as follows: a resolution is 1296×964, a frame rate is 30 fps, and a pixel size is 3.75 μm. The Flea2 FL2G-13S2C color camera has main features of small size, high performance cost ratio, a built-in color processing function, and may implement automatic synchronization by using an IEEE-1394b interface.

The light source is disposed right above the solution collection vessel, and the light source is an LED ring light source. The LED ring light source is disposed right above the solution collection vessel, and may provide stable and uniform illumination for the rare earth solution. The LED ring light source is an RL-90-70-W LED ring light source with a working voltage/power of 24 V/6.24 W. The LED ring light source is in circumference arrangement, light rays emitted by the LED ring light source converge inward, and directions of the light rays are perpendicular to a direction of observation of the color camera or included angles therebetween are approximate to 90°. An LED has advantages of long service, short response time, quite low comprehensive operation costs, environmental friendliness, and the like.

An output end of the color camera is electrically connected to the computer, and the CCD color camera is connected to an image capture card through a 1394 data cable, where the image capture card is installed in a PCI card slot of the computer. The image capture card is a 1394 capture card of a FirePRO 1394b PCIe card model produced by Point Grey.

The computer is electrically connected to the programmable logic controller through a network cable. The computer may be used to perform processing on the real-time image captured by the color camera.

The programmable logic controller is electrically connected to the motor driver. The programmable logic controller may be used to control the motor driver, and the PLC includes an Ethernet module, and is connected to the computer through an RJ45 network interface of the Ethernet module.

The PLC uses a Siemens S7-300 series CPU 314C-2 DP, and the Ethernet module uses 343-1 ADVANCED. The CPU 314C-2 DP is a compact CPU, and may be used in a system of a distributed structure, and a hardware control program may be downloaded in a communication mode by the Ethernet module by using the TCP/IP protocol.

The motor driver is electrically connected to the peristaltic pump through a wire. The motor driver may be used to drive the peristaltic pump. The motor driver is a KMD-542 series stepper motor driver produced by Kamoer Company, and main parameters thereof are as follows: an input voltage range is 9 V to 42 V, an output current is 0.5 A to 4.0 A, and maximum power consumption is 160 W. The KMD-542 series stepper motor drive has the following main features: Temperature protection and overcurrent protection are internally configured, motor noise is optimized, and subdivision precision is adjustable and may reach up to 32-subdivision.

One end of the conduit pipe is communicated with the solution collection vessel, and the other end of the conduit pipe is communicated with rare earth solution in the mixer-settler.

The peristaltic pump is stuck on the conduit pipe. The peristaltic pump may be used to transfer the rare earth solution in the mixer-settler to the solution collection vessel, or transfer the rare earth solution in the solution collection vessel to the mixer-settler. The peristaltic pump is a KDS-FB-2-N17Y stepping motor produced by Kamoer Company, and main parameters of the peristaltic pump include the following: An input voltage is a direct current 24 V, a maximum input current is 1.8 A, and a range of a rotation speed of a pump head is 1 rpm to 500 rpm. The KDS-FB-2-N17Y stepping motor has the following main features: It is suitable for viscous and non-viscous liquid transmission, has an elastic self-adaptive mechanism, has a pump pipe with long service life, and generates lower noise than similar products.

The mixer-settler, the peristaltic pump and the solution collection vessel form a loop through the conduit pipe.

The programmable logic controller, the motor driver, and the peristaltic pump are all disposed on a programmable logic controller rack. The programmable logic controller rack may be fastened to a top part of the camera obscura.

The movable rail bracket is disposed in the camera obscura. The color camera and the light source are disposed on the movable rail bracket.

The movable rail bracket includes a horizontal moving arm and a vertical moving arm, and the horizontal moving arm is flexibly connected to the vertical moving arm. The light source is disposed on the horizontal moving arm, and the color camera is disposed on the vertical moving arm. A position of the LED ring light source on the horizontal moving arm is manually adjusted to make the LED ring light source located right above the solution collection vessel; and a position of the color camera on the vertical moving arm is manually adjusted to make the color camera located in front of the solution collection vessel and directly face the solution collection vessel.

The light source regulator is disposed in the camera obscura. The light source regulator is electrically connected to the light source, and the LED ring light source is connected to the light source regulator through the USB data cable. The light source regulator is a light source digital controller, and may provide high-precision luminance control for the LED ring light source. The light source digital controller may provide 256 levels of luminance adjustment, that is, level 0 to level 255 luminance adjustment, and may ensure continuous lightening for a long time. The light source digital controller may be a light source digital controller produced by Dongguan KST Automation Technology Co., Ltd (CST).

The light source regulator may be used to regulate luminance of the light source, and the light source regulator may regulate intensity of the LED ring light source. This facilitates search of an optimum light source.

The white balance grey chip is disposed in the camera obscura. The white balance grey chip directly faces the solution collection vessel, and is disposed in a direction different from a placement direction of the color camera, that is, located behind the solution collection vessel.

The white balance grey chip may be used to increase a contrast ratio of the rare earth solution in the solution collection vessel and restore a color of the rare earth solution, and the white balance grey chip is disposed behind the solution collection vessel as a shooting background, and may increase a contrast ratio and restore the rare earth solution to an optimum color.

The liquid level sensor is connected to a digital input end of a Siemens PLC. The liquid level sensor includes a first liquid level sensor and a second liquid level sensor. The liquid level sensor is an XKC-Y25-PNP intelligent non-contact liquid level sensor. Main technical parameters of the liquid level sensor include the following: An input voltage range is 5 V to 24 V, a response time is 500 ms, and a liquid level error value is 1.5 mm. The XKC-Y25-PNP intelligent non-contact liquid level sensor has the following main features: It does not need to be in direct contact with liquid, may implement accurate and stable detection, and has a strong anti-interference capability.

The first liquid level sensor is installed on the upper half part of the solution collection vessel. The second liquid level sensor is installed on the lower half part of the solution collection vessel.

The first liquid level sensor and the second liquid level sensor may be used to detect a liquid level of the rare earth solution in the solution collection vessel, and the first liquid level sensor and the second liquid level sensor both are connected to the digital input end of the Siemens PLC.

A digital output end of the Siemens PLC is connected to the motor driver. The motor driver includes a first motor driver and a second motor driver. The peristaltic pump includes a first peristaltic pump and a second peristaltic pump. The first motor driver is electrically connected to the first peristaltic pump, and the second motor driver is electrically connected to the second peristaltic pump.

The first peristaltic pump may be used to transfer the rare earth solution in the mixer-settler to the solution collection vessel. The second peristaltic pump may be used to transfer the rare earth solution in the solution collection vessel to the mixer-settler.

A written PLC hardware control program is downloaded to a CPU of the Siemens PLC through the Ethernet module. The hardware control program is a program written according to a function of a rare earth solution image information acquisition device, and may be used to implement a function of controlling the rare earth solution image information acquisition device by the PLC.

The upper computer control software is installed in the computer, and includes a WINCC solution collection control module, an image capture module, an image processing module, a data information display and storage module, and an upper computer software interface. The image processing module includes MFC image processing software, and the WINCC solution collection control module includes WINCC visual software.

The WINCC solution collection control module may be used to control start/stop of a solution collection process, and display real-time statuses of liquid levels of each sensor, the peristaltic pump, and the solution collection vessel, so as to monitor the rare earth solution image information acquisition device in real time and find and resolve a fault in time, to ensure normal operation of the hardware platform.

The upper computer software interface includes an upper computer WINCC solution acquisition control interface and an upper computer MFC image processing interface. FIG. 3 is a diagram of a WINCC solution acquisition control interface according to Embodiment 3 of the present invention. FIG. 3 shows an upper computer WINCC solution acquisition interface. To be specific, a rare earth solution acquisition process visual interface shown in FIG. 3 includes a visual area 23, a cycle time setting and display area 24, and a key control area 25. The visual area 23 may implement real-time monitoring of statuses of a peristaltic pump and a sensor, and may display a change of a liquid level. In the cycle time setting and display area 24, a rare earth solution collection time, a standing time for photographing, a solution reflux time, and a time for waiting for a next cycle may be set. A function of the key control area 25 is to control start/stop of a lower computer (PLC) and manually control a switch of the peristaltic pump and closing of the WINCC visual software. In FIG. 3, a sensor #1 is a first liquid level sensor; a sensor #2 is a second liquid level sensor; a peristaltic pump #1 is a first peristaltic pump; and a peristaltic pump #2 is a second peristaltic pump.

Figure 4:
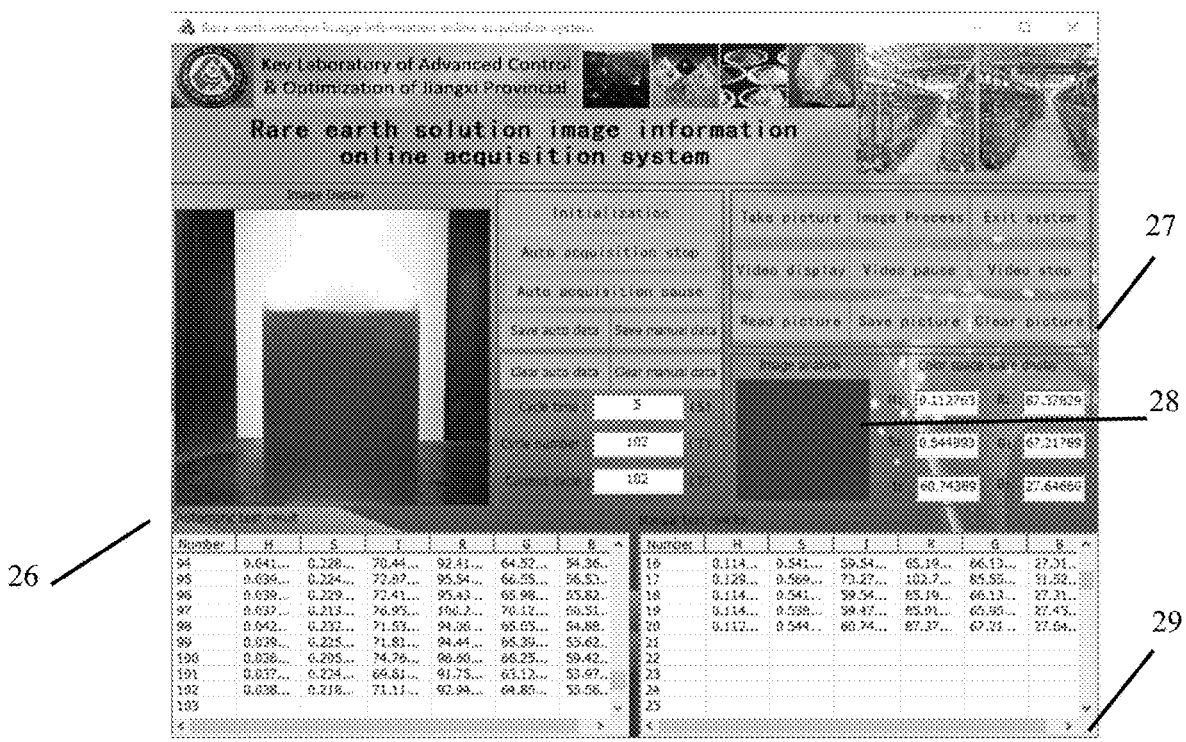
FIG. 4 is a diagram of an MFC image processing control interface according to Embodiment 3 of the disclosure.

FIG. 4 is a diagram of an MFC image processing control interface according to Embodiment 3 of the present invention. FIG. 4 shows an upper computer MFC image processing interface. To be specific, an online rare earth solution image capture and processing platform in FIG. 4 includes an image display area 26, a key control area 27, an image analysis area 28, and a result display and storage area 29. The image display area 26 may display a captured image in real time, and may also be used as a video display window;

the key control area 27 has functions of image acquisition, image processing and analysis, automatic acquisition and manual acquisition, video display, image reading, and the like; and the result display and storage area 29 may display a processed image and color feature information and store the information.

An image capture module may be used to adjust an LED ring light source to suitable luminance after a solution acquisition process is completed, so that a CCD color camera is aligned with a white balance gray card; an image of rare earth solution accommodated in a solution collection vessel is acquired through real-time detection software, and the image is transmitted to an image capture card in a computer through a 1394 data cable.

An image processing module is used for image smoothing filtering, image background removal, and image color feature information extraction.

Resolution of an image captured by the image capture module is 1280×960. To eliminate interference, received during image capturing and transmission, from an environmental background part included in a random interference signal, filtering and background segmentation need to be performed on the image before a color feature component is extracted.

A color image captured by a color camera is converted to an RGB image. Because in HSI color space, H (hue), S (saturation) and I (intensity) are independent of each other and may be processed separately, during conversion from RGB space to HSI space, median filtering is performed on an HSI image to reduce impact of an environmental background part.

Background segmentation is performed on the median-filtered image by using an automatic threshold algorithm, a specified area is selected according to an area feature to separate a solution part of the image, so as to obtain pixel center coordinates of the target solution part, and the image is cropped into a square image with a size 128×128 by using the pixel center coordinates as a center.

Because a pixel of the square image obtained by image background removal is 128×128, H, S, and I component values extracted from these images are all matrices of 128 rows and 128 columns. Based on the moment descriptor uniqueness theorem: a moment feature may completely reflect all features of an image, a first-order moment, that is, a statistical value of an image color component, namely, an expected value, also referred to as a mean value, may be used to describe a statistical feature of ion color information in an ion extraction separation process of the rare earth solution part. And it is calculated as follows:

$$\mu = \frac{1}{MN}\sum_{i=1}^{M}\sum_{j=1}^{N} P_{ij}$$

In the formula, $\mu$ is a first-order moment of a color feature component H, S, or I of an image; M is a number of row elements of a color feature component matrix; N is a number of column vectors; M=N=128; $P_{ij}$ is an element value of a feature component matrix; (i, j) is coordinates of a current pixel point; i is a current row pixel coordinate, i=1, 2, . . . , M; and j is a current column pixel coordinate, j=1, 2, . . . , N.

A data display and storage module: after an image processing process is completed, upper computer control software may display, in a result storage area, color feature information extracted after image processing, where the result storage area is in WC image processing software. Stored data information may also be queried and exported in a relevant path of a background of upper computer control software, and may provide a large amount of real and effective data for establishment of a component content soft-sensing prediction model.

Figure 5:
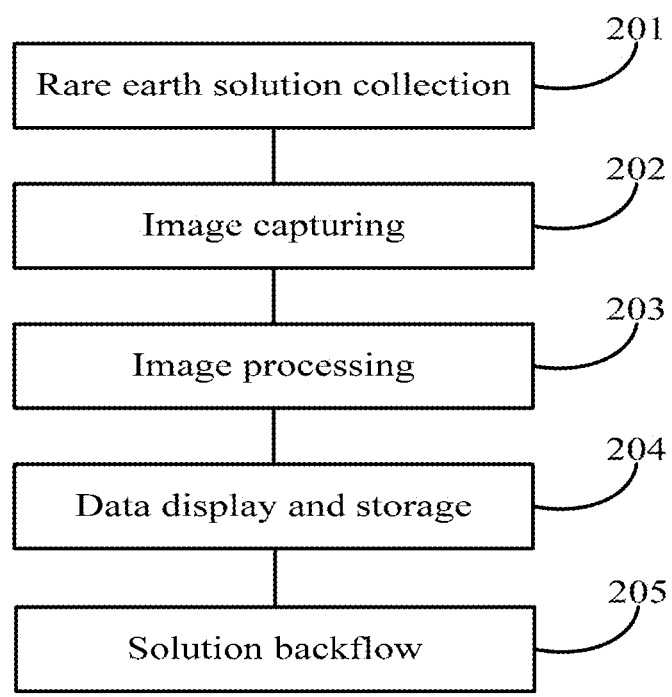
FIG. 5 is a flowchart of collecting rare earth solution and performing image processing by a rare earth extraction solution collection and image acquisition hardware platform according to Embodiment 3 of the disclosure.

FIG. 5 is a flowchart of collecting rare earth solution and performing image processing by the rare earth extraction solution collection and image acquisition hardware platform according to Embodiment 3 of the present invention. Referring to FIG. 5, the flowchart of collecting rare earth solution and performing image processing by the rare earth extraction solution collection and image acquisition hardware platform includes the following steps:

Step 301. Collect rare earth solution. A start/stop button is pressed on a WINCC visual interface to start the rare earth extraction solution collection and image acquisition hardware platform, rare earth solution in a mixer-settler is collected into a solution collection vessel, and standing is performed for a period of time after collection is completed, so that a liquid level of rare earth solution in the solution collection vessel keeps stable. An exemplary process of collecting the rare earth solution in the mixer-settler into the solution collection vessel includes: controlling, by using a programmable logic controller, a first motor driver to drive a first peristaltic pump, and transferring, by the first peristaltic pump, the rare earth solution in the mixer-settler to the solution collection vessel.

Step 302. Perform image capturing. A light source regulator is regulated to adjust an LED ring light source to a specified luminance level, and a color camera is aligned with the solution collection vessel. An image capture operation is performed on a software interface of a computer. The color camera captures an image of the rare earth solution in the solution collection vessel, and the image is converted by an image capture card; a converted image is transmitted to the computer and displayed on upper computer control software, so as to complete a solution image acquisition process of the computer. An exemplary process of regulating the light source regulator to adjust the LED ring light source to the specified luminance level includes: manually adjusting, according to a capturing environment, a position of the ring light source on a horizontal moving arm to make the ring light source disposed right above the solution collection vessel; the ring light source is adjusted by using the light source regulator to make an image captured by the color camera clearest, so as to determine the position of the ring light source and a level of the light source regulator, and make the position of the ring light source and the level of the light source regulator keep unchanged.

Step 303. Perform image processing. The captured image is converted from RGB space to HSI space by using MFC image processing software, and median filtering may be used to process the image to reduce impact of an environmental background part. Background segmentation is performed on the median-filtered image, a rare earth solution part of the image is separated to obtain pixel center coordinates of the target solution part, and the image is cropped into a square image with a size 128×128 by using the pixel center coordinates as a center, and first-order moments of color feature components H and S of the square image are extracted.

Step 304. Perform data display and storage. After image processing is completed, color feature information extracted after the image processing is displayed in a result storage area by using the upper computer control software, and data information of the color feature information is also stored in an Excel file of a specified path of a background of the upper computer control software, for performing querying and exportation in time if necessary.

Step 305. Perform solution backflow. After a component content detection process is completed, rare earth solution in the collection vessel flows back to the mixer-settler through the peristaltic pump, and after backflow is completed, the peristaltic pump stops working and waits for a next cyclic process. An exemplary operation process of the upper computer control software includes starting a Siemens PLC hardware system in a WINCC solution acquisition control module, and performing composite control on the peristaltic pump according to an input status of a liquid level sensor to collect to-be-tested rare earth solution from the mixer-settler into the solution collection vessel. The color camera is controlled in a real-time detection software interface designed in the computer, to acquire an image of the to-be-tested rare earth extraction solution in the solution collection vessel; the image is processed through a processing program of the MFC image processing software and a color feature value is extracted, and finally color feature information extracted after image processing is displayed in the result storage area. Stored data information may be queried and exported in a relevant path of a background, and may also provide a large amount of real and effective data for establishment of a component content soft-sensing prediction model.

Information about the rare earth solution image captured in Embodiment 3 is image color feature information that is extracted by the image processing module according to the image, acquired by the color camera, of the rare earth solution accommodated in the solution collection vessel.

In various embodiments, a rare earth solution image capture device may perform detection continuously in real time; the rare earth solution image capture device may further extract color feature information of rare earth solutions, thereby providing a large amount of real and effective data for establishment of a component content soft-sensing production model. The rare earth solution image capture method may utilize a computer to process an image to reduce labor intensity and improving efficiency.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments may be used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A rare earth solution image capture device, comprising:
a mixer-settler, a support platform, a camera obscura, a solution collection vessel, a color camera, a light source, a computer, a programmable logic controller, a motor driver, a peristaltic pump, and a conduit pipe, wherein:
the mixer-settler and the solution collection vessel are used to accommodate rare earth solution;
the support platform, the solution collection vessel, the color camera, and the light source are all disposed in the camera obscura;
the solution collection vessel is disposed on the support platform;
the color camera directly faces the solution collection vessel;
the light source is disposed right above the solution collection vessel;
an output end of the color camera is electrically connected to the computer;
the computer is electrically connected to the programmable logic controller;
the programmable logic controller is electrically connected to the motor driver;
the motor driver is electrically connected to the peristaltic pump;
one end of the conduit pipe is communicated with the solution collection vessel;
the other end of the conduit pipe is communicated with the rare earth solution;
the peristaltic pump is stuck on the conduit pipe;
the camera obscura is used to isolate an external light source;
the color camera is used to capture a real-time image of the rare earth solution in the solution collection vessel;
the computer is used to perform processing on the real-time image captured by the color camera;
the programmable logic controller is used to control the motor driver;
the motor driver is used to drive the peristaltic pump; and
the peristaltic pump is used to transfer the rare earth solution in the mixer-settler to the solution collection vessel, or transfer the rare earth solution in the solution collection vessel to the mixer-settler.

2. The rare earth solution image capture device according to claim 1, wherein:
the rare earth solution image capture device further comprises a programmable logic controller rack, and
the programmable logic controller, the motor driver, and the peristaltic pump are disposed on the programmable logic controller rack.

3. The rare earth solution image capture device according to claim 1, wherein:
the rare earth solution image capture device further comprises a movable rail bracket;
the movable rail bracket is disposed in the camera obscura; and
the color camera and the light source are disposed on the movable rail bracket.

4. The rare earth solution image capture device according to claim 1, wherein:
the rare earth solution image capture device further comprises a light source regulator;
the light source regulator is disposed in the camera obscura;
the light source regulator is electrically connected to the light source; and
the light source regulator is used to regulate luminance of the light source.

5. The rare earth solution image capture device according to claim 1, wherein:
the rare earth solution image capture device further comprises a white balance grey chip;
the white balance grey chip is disposed in the camera obscura;
the white balance grey chip directly faces the solution collection vessel, and is disposed in a direction different from a placement direction of the color camera; and
the white balance grey chip is used to increase a contrast ratio of the rare earth solution and restore a color of the rare earth solution.

6. The rare earth solution image capture device according to claim 1, wherein:
the rare earth solution image capture device further comprises a first liquid level sensor and a second liquid level sensor;
the first liquid level sensor is installed on the upper half part of the solution collection vessel;
the second liquid level sensor is installed on the lower half part of the solution collection vessel; and
the first liquid level sensor and the second liquid level sensor are used to detect a liquid level of the rare earth solution in the solution collection vessel.

7. The rare earth solution image capture device according to claim 1, wherein:
the motor driver comprises a first motor driver and a second motor driver;
the peristaltic pump comprises a first peristaltic pump and a second peristaltic pump;
the first motor driver is electrically connected to the first peristaltic pump, and the second motor driver is electrically connected to the second peristaltic pump;
the first peristaltic pump is used to transfer the rare earth solution in the mixer-settler to the solution collection vessel; and
the second peristaltic pump is used to transfer the rare earth solution in the solution collection vessel to the mixer-settler.

8. A rare earth solution image capture method implemented by the device in claim 1, comprising the steps of:
obtaining a starting signal, controlling, by using a programmable logic controller, a first motor driver to drive a first peristaltic pump, and transferring, by the first peristaltic pump, rare earth solution in a mixer-settler to a solution collection vessel;
after transferring of the rare earth solution is performed for a first specified time period, controlling, by using the programmable logic controller, the first motor driver to stop driving the first peristaltic pump;
after standing is performed for a second specified time period, regulating a position and luminance of a light source, and adjusting a position and a shooting angle of a color camera;
obtaining an image of the rare earth solution in the solution collection vessel captured by the color camera, processing the captured image, and storing a processing result;
controlling, by using the programmable logic controller, a second motor driver to drive a second peristaltic pump, and transferring, by the second peristaltic pump, the rare earth solution in the solution collection vessel to the mixer-settler; and
after transferring of the rare earth solution is performed for a third specified time period, controlling, by using the programmable logic controller, the second motor driver to stop driving the second peristaltic pump.

9. The rare earth solution image capture method according to claim 8, wherein before the processing of the captured image, the method further comprises:
performing digital conversion on the obtained image of the rare earth solution in the solution collection vessel captured by the color camera.

10. The rare earth solution image capture method according to claim 9, wherein the processing of the captured image comprises:
converting the converted image from RGB space to HSI space, and performing median filtering on the converted image;
performing background segmentation on the median-filtered image, and separating a solution part of the median-filtered image, to obtain pixel center coordinates of the target solution part; and
cropping the image by using the pixel center coordinates as a center to obtain a square image, and extracting a color feature component from the square image.

* * * * *